United States Patent
Hennesy

(10) Patent No.: US 12,555,854 B2
(45) Date of Patent: Feb. 17, 2026

(54) VACUUM INSULATED BATTERY

(71) Applicant: GLOBUS MEDICAL, INC., Audubon, PA (US)

(72) Inventor: Timothy Hennesy, Towson, MD (US)

(73) Assignee: Globus Medical Inc., Audubon, PA (US)

( * ) Notice: Subject to any disclaimer, the term of this patent is extended or adjusted under 35 U.S.C. 154(b) by 0 days.

(21) Appl. No.: 17/529,608

(22) Filed: Nov. 18, 2021

(65) Prior Publication Data

US 2023/0155229 A1    May 18, 2023

(51) Int. Cl.
| | |
|---|---|
| H01M 50/213 | (2021.01) |
| H01M 10/42 | (2006.01) |
| H01M 10/653 | (2014.01) |
| H01M 50/271 | (2021.01) |
| H01M 50/289 | (2021.01) |

(52) U.S. Cl.
CPC ....... *H01M 50/213* (2021.01); *H01M 10/425* (2013.01); *H01M 10/653* (2015.04); *H01M 50/271* (2021.01); *H01M 50/289* (2021.01); *H01M 2010/4271* (2013.01); *H01M 2220/30* (2013.01)

(58) Field of Classification Search
CPC ............. H01M 50/213; H01M 10/653; H01M 50/289; H01M 50/271; H01M 10/425; H01M 2010/4271; H01M 2220/30
See application file for complete search history.

(56) References Cited

U.S. PATENT DOCUMENTS

| | | | |
|---|---|---|---|
| 6,756,766 B2 | 6/2004 | Miller | |
| 7,872,446 B2 | 1/2011 | Cover et al. | |
| 10,084,166 B2 | 9/2018 | Kerspe et al. | |
| 10,446,895 B2 | 10/2019 | Pedicini | |
| 11,000,293 B2 | 5/2021 | MacDonald et al. | |
| 11,056,727 B2 | 7/2021 | Guglielmo et al. | |
| 11,413,258 B2 | 8/2022 | Hattersley | |
| 2004/0086758 A1* | 5/2004 | Vuk et al. | H01M 8/249 429/428 |
| 2005/0022966 A1 | 2/2005 | Takahashi | |
| 2005/0096661 A1 | 5/2005 | Farrow et al. | |
| 2016/0023833 A1* | 1/2016 | Hallab | B65D 81/022 220/592.22 |
| 2016/0218404 A1 | 7/2016 | Pedicini | |
| 2016/0287265 A1* | 10/2016 | Macdonald et al. | H01M 10/052 |
| 2017/0062774 A1* | 3/2017 | Reid et al. | H01M 50/24 |

(Continued)

FOREIGN PATENT DOCUMENTS

| | | |
|---|---|---|
| CN | 206742307 U | 12/2017 |
| CN | 107834001 A | 3/2018 |

(Continued)

*Primary Examiner* — Matthew T Martin
*Assistant Examiner* — Alexandra J Simmons

(57) ABSTRACT

Vacuum insulated battery housings, packs, systems, powered instruments, and methods. The insulated battery system may include a vacuum insulated housing with an outer wall and an inner wall having a vacuum space in between. One or more battery cells and other components are receivable in the vacuum insulated housing. A lid or casing seals the vacuum insulated housing. The insulated battery system protects the battery cells and other battery components from thermal degradation, for example, during autoclave or steam sterilization procedures.

18 Claims, 14 Drawing Sheets

(56) References Cited

U.S. PATENT DOCUMENTS

2020/0161881 A1\* 5/2020 Ahmed ................ H02J 7/0042
2021/0336375 A1 10/2021 Geoffroy et al.

FOREIGN PATENT DOCUMENTS

| | | |
|---|---|---|
| CN | 214589095 U | 11/2021 |
| DE | 10319350 A1 | 11/2004 |
| EP | 0255631 A1 | 2/1988 |
| JP | 2006218228 A | 8/2006 |
| JP | 2018-509732 A | 4/2016 |
| JP | 2018-5129952 A | 5/2018 |
| JP | 2020-527834 A | 9/2020 |
| WO | WO 2012178205 A2 \* 12/2012 .......... H01M 50/209 |
| WO | 2016161322 A1 | 10/2016 |
| WO | 2021170857 A1 | 9/2021 |

\* cited by examiner

VACUUM INSULATED BATTERY

FIELD OF THE INVENTION

The present application relates generally to battery systems, and more particularly, to insulated battery packs for rechargeable batteries, for example, for surgical powered devices.

BACKGROUND OF THE INVENTION

Batteries are needed for cordless powered devices. Rechargeable batteries take in energy from an external source, typically mains electric power, as electrical energy and store it as chemical energy in the battery cells. When the tool needs energy, the battery converts the stored chemical energy back to electrical energy which provides useful power to the tool. The means by which the energy is stored in a battery can vary greatly in chemistry, for example, from lead acid, to nickel metal hydride, to nickel-cadmium, to lithium ion. All of these chemistries begin to degrade and lose cycle life as the temperature of the cell increases due to the break-down of the layers of material inside the cells at higher temperatures. These degradation effects are exacerbated if the cell is at a high state of charge during these temperature excursions.

In surgical settings, it is often desirable to have a powered device to aid in the operation, for example, for cutting, drilling, or screwing into bone. This introduces the need for powered instruments in a sterile operating room environment. The most common sterilization technique that can be found in every sterile operating setting is autoclave or high pressure, high temperature steam sterilization.

Due to the nature of sterile operating environments, batteries may be unable to be charged immediately before use. This may be due to the time needed to charge a pack or limitations on having to sterilize the charger. Because of these constraints, the batteries used in a sterile environment are often fully charged prior to autoclave sterilization. This poses the worst possible case for battery cycle life: very high temperature and a full state of charge.

The current state of the sterile battery market is to use lithium iron phosphate cells and accept that they will get hot. This chemistry is the most tolerant to large temperature excursions, but it still greatly increases the degradation rate of the cells. Some designs have attempted to limit the heat seen by the cells, for example, with a thin fibrous blanket impregnated with aerogel particles. Aerogel has a very low thermal conductivity which may limit the heat the cells experience by increasing the thermal resistance of the surroundings. These designs may help to reduce the temperature of cells in autoclave and improve cycle life, but only by a nominal amount. The aerogel provides for battery life of a few hundred cycles, which is far from the expected 2000 cycles based on the type of cell.

The high degradation rates lead to a lot of scrap battery cells. Due to the low battery life, the hospitals also need to repurchase additional batteries leading to environmental and monetary waste. Accordingly, there exists a need for a robust system for having a sterile battery system that can protect the cells at elevated temperatures even at a full charge.

SUMMARY OF THE INVENTION

To meet this and other needs, vacuum insulated battery housings, systems, and methods are provided. The vacuum insulated systems reduce heating of internal battery pack components including the cells and the battery management system (BMS) components. The vacuum insulated housing reduces the thermal degradation of the battery pack, thereby allowing for longer useful lifespans. The insulated systems allow for alternate battery chemistries that can greatly increase the energy and power density over traditional designs. The vacuum insulated systems yield a superior battery pack with longer lifespan, longer runtime, and/or higher power in a similar package size and unit cost.

According to one embodiment, an insulated battery system includes a vacuum insulated housing, one or more battery cells, a printed circuit board or battery management system, and a lid or casing. The vacuum insulated housing includes an outer wall and an inner wall with a vacuum space in between the outer and inner walls. The inner wall defines a central hollow chamber. The battery cell is receivable in a battery holder. The printed circuit board is electrically connected to the battery holder. The battery cell, the battery holder, and the printed circuit board are receivable inside the hollow chamber of the vacuum insulated housing. The casing is configured for sealing the vacuum insulated housing, thereby protecting the components from moisture and elevated temperatures during autoclave sterilization.

The insulated battery system may include one or more of the following features. The outer wall of the vacuum insulated housing may include an outer side wall and an outer bottom wall, and the inner wall may include an inner side wall and an inner bottom wall. The outer and inner side walls may meet at a top lip to fully enclose the vacuum space. The vacuum insulated housing may have a generally cylindrical body. The vacuum insulated housing may include a narrowed neck and the casing may engage with the narrowed neck to thereby seal the battery system. The vacuum insulated housing may include two 0.5 mm walls with a 3-4 mm vacuum gap in between. One or more electrical pass-throughs may be provided to allow current to exit from the vacuum insulated housing. The electrical pass-through may include a conductor in or through the casing. The conductor may include a body with a blind hole through a top surface, a seat for contacting the printed circuit board, and a central ring with an o-ring seat for receiving an o-ring positioned between the conductor and the casing. A screw may be threaded into the blind hole with a head of the screw pressing against and securing a spring terminal and thereby sealing the pass-through. The conductor may be connected to the printed circuit board with a wire. The conductor may include a rounded bottom seat with a wire trap configured to retain the wire.

According to one embodiment, an insulated battery pack includes a vacuum insulated housing, a casing, a battery holder, a rechargeable battery cell, a printed circuit board, and an electrical pass-through. The vacuum insulated housing may extend from a top lip to a bottom wall and define a central hollow chamber. The vacuum insulated housing may include an outer wall and an inner wall with a vacuum space in between. The casing is configured for sealing the vacuum insulated housing. The battery holder is positionable in the hollow chamber of the vacuum insulated housing. The rechargeable battery cell connects to the battery holder. The printed circuit board electrically connects to the battery holder. The electrical pass-through in the casing connects the printed circuit board to a spring terminal for providing power to the tool. The casing may include a tool interface configured to releasably secure the battery pack to a powered instrument, such as a drill, cutter, or driver. The casing may include a check valve embedded therein to allow for any gasses to escape.

According to another embodiment, a vacuum insulated battery system includes a vacuum insulated housing, a vacuum insulated lid, and a separator. The vacuum insulated housing may extend from a top lip to a bottom wall and may have a narrowed neck near the top lip. The vacuum insulated housing may include an outer wall and an inner wall with a vacuum space in between. The inner wall may define a central hollow chamber. The vacuum insulated lid for sealing the vacuum insulated housing may include an outer wall and an inner wall with a vacuum space in between. The separator may be positioned between the vacuum insulated lid and the vacuum insulated housing. The separator may include a ring having an upper band with a recessed outer surface configured to mate with the lid and a lower band with a recessed inner surface configured to mate with the neck of the vacuum insulated housing. The separator may act as an electrical pass-through. The vacuum insulated battery system is configured to hold rechargeable battery cell(s), thereby protecting the battery cell(s) from thermal degradation, for example, during steam sterilization or autoclave procedures. The vacuum insulated battery system may include a phase change material, such as paraffin wax or polyethylene oxide, to further increase the thermal efficiency of the system.

According to another embodiment, a cordless powered instrument includes a handle and an insulated battery pack configured to be attached thereto. The insulated battery pack includes a vacuum insulated housing and a casing for thermally insulating battery cells and other battery components during autoclave and/or sterilization. The casing may have a tool interface configured to slidably interface with the handle of the instrument. The powered instrument may include a drill, cutter, driver, or other surgical instrument.

According to yet another embodiment, a method of thermally insulating rechargeable battery cells during sterilization may include: (1) charging one or more rechargeable battery cells, preferably to a full state of charge; (2) positioning the rechargeable battery cells inside a vacuum insulated housing; (3) sealing the vacuum insulating housing with a lid or casing to form a battery pack; (4) subjecting the battery pack to high temperatures, high pressures, steam, and/or other autoclave or sterilization procedures to sterilize the battery pack; (5) attaching the battery pack to a cordless powered instrument before or after sterilization and performing the surgical procedure. The insulated battery pack is configured to protect the batteries and other components during sterilization even with a full state of charge, thereby preventing thermal degradation and improving battery performance and cycle life.

Also provided are kits including battery packs, rechargeable batteries, powered instruments and tools, and other components.

BRIEF DESCRIPTION OF THE DRAWINGS

A more complete understanding of the present invention, and the attendant advantages and features thereof, will be more readily understood by reference to the following detailed description when considered in conjunction with the accompanying drawings, wherein.

DETAILED DESCRIPTION OF THE INVENTION

Figure 1:
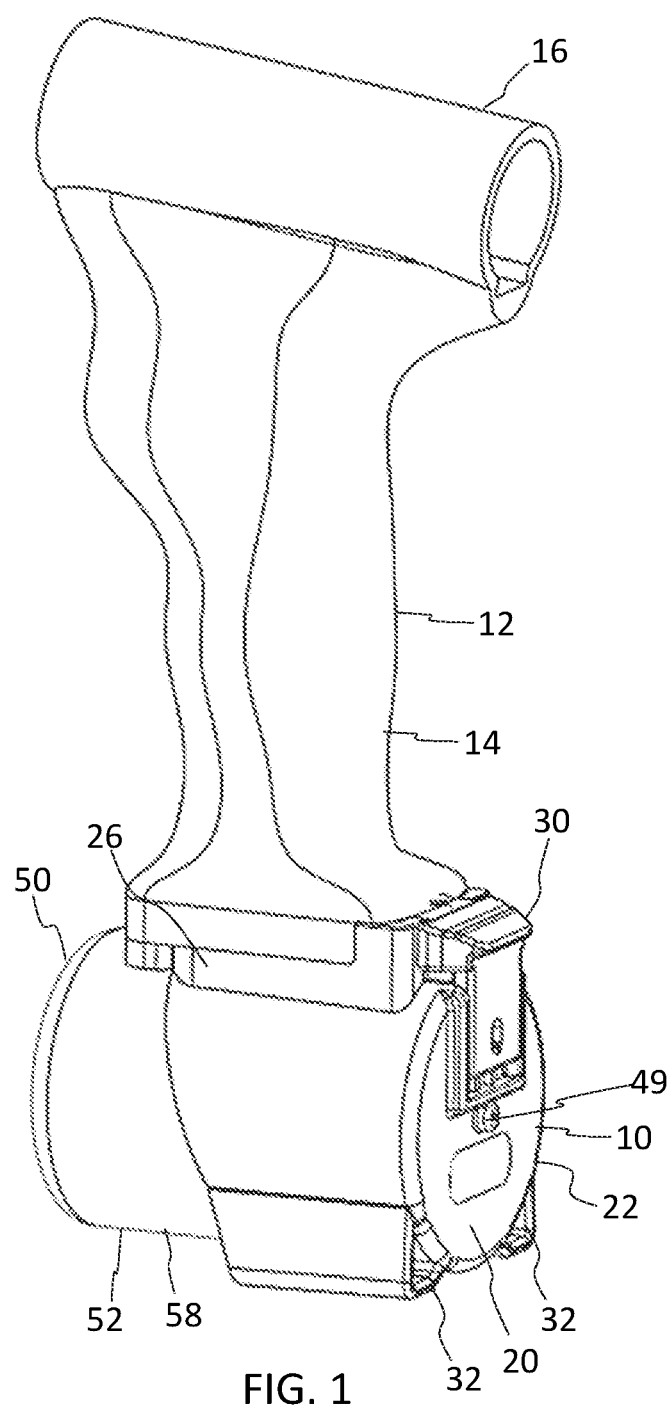
FIG. 1 shows a perspective view of a cordless powered instrument including a tool handle coupled to a battery pack according to one embodiment.

Embodiments of the disclosure are generally directed to vacuum insulated housings, systems, and methods. Specifically, embodiments are directed to vacuum insulated housings and systems configured to protect the battery cells and components of the battery pack at elevated temperatures even at a full state of charge. The vacuum insulated housing and systems are configured to be sterilized, for example, using standard steam sterilization autoclave procedures used in surgical settings while protecting the internal components.

Batteries are needed for cordless powered devices, such as drills, drivers, and other instruments used during surgical procedures. Portable rechargeable or secondary batteries are often used for powering the instruments during the operation. The rechargeable batteries may include, in order of increasing power density and cost: nickel-cadmium (NiCd), nickel-zinc (NiZn), nickel metal hydride (NiMH), and lithium-ion (Li-ion) cells. Lithium-ion batteries have a higher average voltage and typically a higher energy density than other chemistries.

Within lithium ion, there is also a range of sub-chemistries based on the composition of metals used for the cathode. The dominant ones are nickel manganese cobalt (NMC), which is typically used in electric vehicles (EV); nickel cobalt aluminum (NCA) which is the highest specific energy chemistry and is often found in power tools as well as some EV's; and the last main chemistry is iron phosphate ($LiFePO_4$) which has a much lower energy density and has a lower voltage than NCA or NMC. Higher currents increase degradation of cells and lead to higher heating during discharge of both the cells and any motor the cells are powering. That said, the iron phosphate chemistry is much more tolerant to heat and abuse, degrading at a slower rate at elevated temperatures. It also has a much longer cycle life, for example, approximately 2000 cycles (where one charge and one discharge=one cycle) where the other chemistries are around 500 cycles. This leads to iron phosphate being used mostly in grid storage or other environments when reliability and lifespan are the primary motivators.

All of these chemistries begin to degrade and lose cycle life as the temperature of the cell increases due to the break-down of the layers of material inside the cells at these higher temperatures. Degradation is almost zero at 25° C. and begins increasing at an accelerating rate as temperature increases. Over 60° C., the degradation of the cell increases rapidly. These degradation effects are exacerbated if the cell is at a high state of charge during these temperature excursions.

In a surgical setting involving cutting, drilling, or screwing into bone, for example, it is often desirable to have a powered device to aid in the procedure. This introduces the need for powered instruments in a sterile operating room (OR) environment. The most common sterilization technique that can be found in a sterile operating setting is autoclave or high pressure and high temperature steam sterilization. This may involve sealing the battery pack in a chamber that is filled with steam at 134° C. and 2.2 bar and held at that temperature and pressure for at least 4 minutes. However, due to the slow rise in temperature and a typical dry period, the time above 60° C. in the chamber may be much longer than that, for example, around 40-50 minutes most of which is over 90° C.

Due to the nature of sterile operating environments batteries may be unable to be charged immediately before use. This may be due to the time needed to charge a pack especially in an environment where there may be unexpected immediate demand for a charged pack, such as trauma cases. It may also be due to the limitations of having to sterilize a charger. Because of these limitations, the batteries used in a sterile environment must be fully charged prior to autoclave sterilization. This creates the worst possible case for battery cycle life: very high temp (134° C.) and full state of charge.

This introduces a need to have a battery housing that is able to resist temperature rise of the cells internal to the housing to limit the degradation rate of the cells. The current state of the sterile battery market is to use $LiFePO_4$ cells and just accept that they will get hot. This chemistry is the most tolerant to large temperature excursions. However, it still greatly increases the degradation rate of the cells. Cells that typically achieve 2000+ cycles can be expected to be able to achieve only 100-200 cycles in these conditions. Some designs try to limit some of the heat seen by the cells with a thin (~3 mm) fibrous blanket impregnated with aerogel particles. Aerogel has a very low thermal conductivity and when surrounding the cells can limit the heat the cells experience by increasing the thermal resistance of the surroundings. These designs may be superior in both temperature of the cells in autoclave as well as in cycle life, but are still getting only a few hundred cycles, far from the expected 2000 cycles based on the type of cell.

The high degradation rate leads to a lot of scrap to recycle battery cells and a lot of repurchasing of batteries by the hospitals leading to environmental and monetary waste. Additionally, the high temperature of even the aerogel wrapped design precludes the use of higher energy density and higher voltage chemistry cells, such as NMC.

One method some have used to side step the entire autoclave issue is to not autoclave the batteries themselves, but instead to autoclave a secondary housing into which a non-sterile battery is placed. This introduces other hazards where a sterile user needs to hold the sterile housing, a second non-sterile user carefully drops the non-sterile battery into the housing, and then the sterile user closes the housing. This dance needs to be done prior to surgery in the sterile OR. This introduces many more points of failure in sterility, additional people in the OR, additional parts and pieces to the battery assembly, and/or a larger overall battery size when in use. These complications have prevented this from becoming a dominant method of bringing power to the OR despite the option to then be able to use better cells and not stress the cells.

Some applications have introduced insulation, such as the aerogel blanket, which simply tries to trap as much air in a means that isolates the air from convection. Air has one of the lowest thermal conductivities of common materials only being surpassed by other pure gasses. Air under normal circumstances, can convect which increases the rate of heat transfer across insulation. Some insulations try to trap this air from convection while introducing as little other material as possible and assuring that material has as low of a conductivity as possible. This limits heat transfer means to mostly only radiation and conduction through a poor conductor. Aerogel does this by being over 99% air with the rest of the material being silica, another very poor conductor. Typical applications for batteries cannot use pure aerogel blocks due to cost, manufacturing, and durability reasons. Because of this, it is more common to see aerogel powder in a fabric. This decreases the benefits by leaving gaps for air to move between the aerogel crystals and between the fabric fibers while also introducing another conductor path through the fabric.

This leaves a need for a sterile battery that can fully insulate the cells, opening the option to use $LiFePO_4$ cells that actually meet the expected cycle life of 2000+ cycles, possibly making the lifespan of the pack 10× or more, and/or the option to use alternate chemistries doubling or more the runtime and increasing the voltage for the same size pack.

Additional aspects, advantages and/or other features of example embodiments of the invention will become apparent in view of the following detailed description. It should be apparent to those skilled in the art that the described embodiments provided herein are merely exemplary and illustrative and not limiting. Numerous embodiments of modifications thereof are contemplated as falling within the scope of this disclosure and equivalents thereto.

Referring now to FIG. 1, an insulated battery system or battery pack 10 is shown attached to a cordless power tool or instrument 12 according to one embodiment. The insulated battery system or battery pack 10 may attach to an underside of a handle 14 of the cordless instrument 12, for example. The cordless powered instrument 12 may include drills, drivers, cutters, or other powered instruments. For example, a drill bit, screw driver, curette, etc. may be positioned through and interface with a sleeve 16 of the instrument 12 to perform the desired procedure. Although only the handle 14 and sleeve 16 are depicted for the instrument 12, it will be appreciated that the other suitable components are present for proper functionality of the instrument 12. The battery pack 10 is configured to supply power to tool 12 to perform the intended function, e.g., drilling, driving, cutting, etc. Although it is envisioned that the instrument 12 is configured to perform a surgical procedure, it will be appreciated that the battery pack 10 may be suitable for use in other applications as well.

Figure 2:
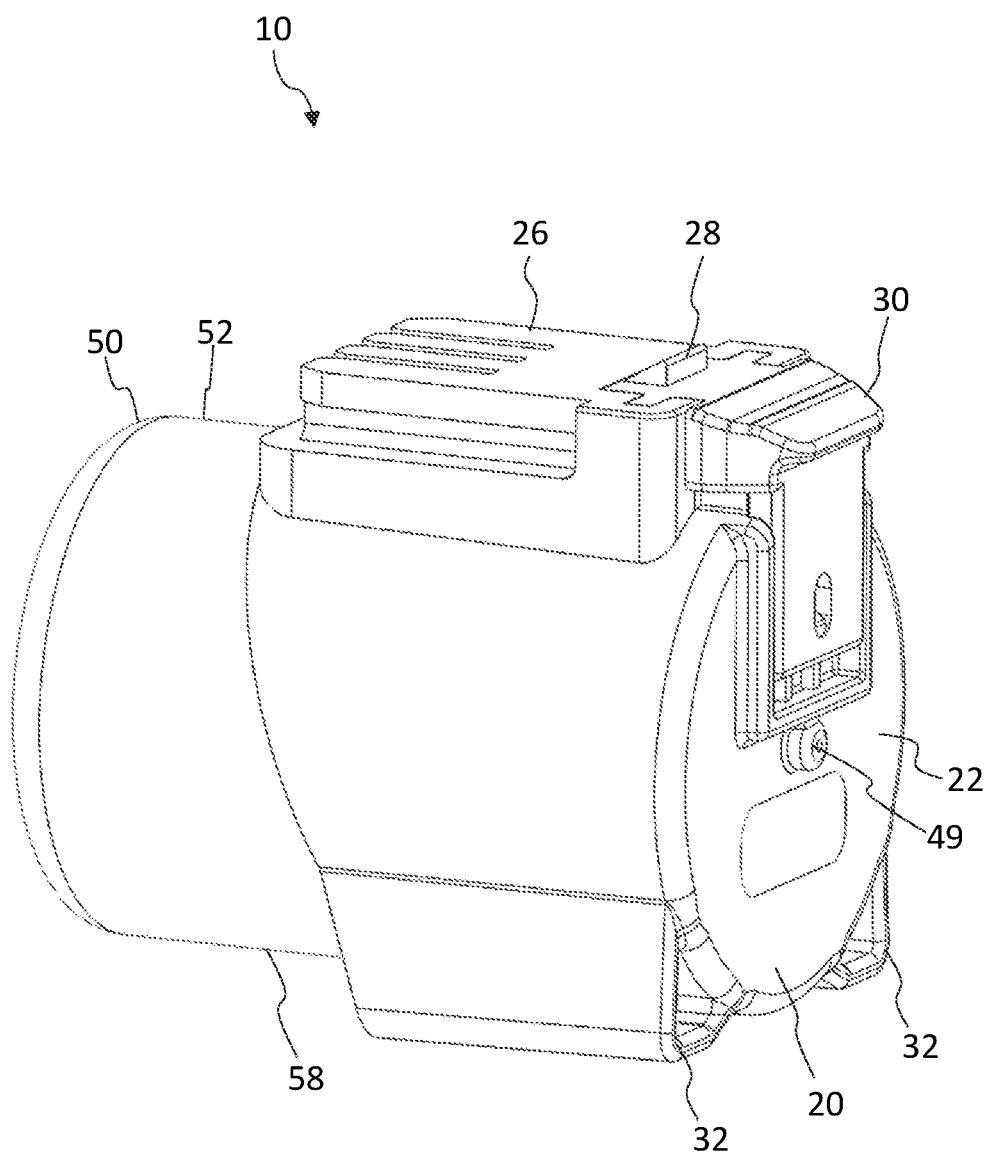
FIG. 2 shows a rear perspective view of the battery pack of FIG. 1.
Figure 3:
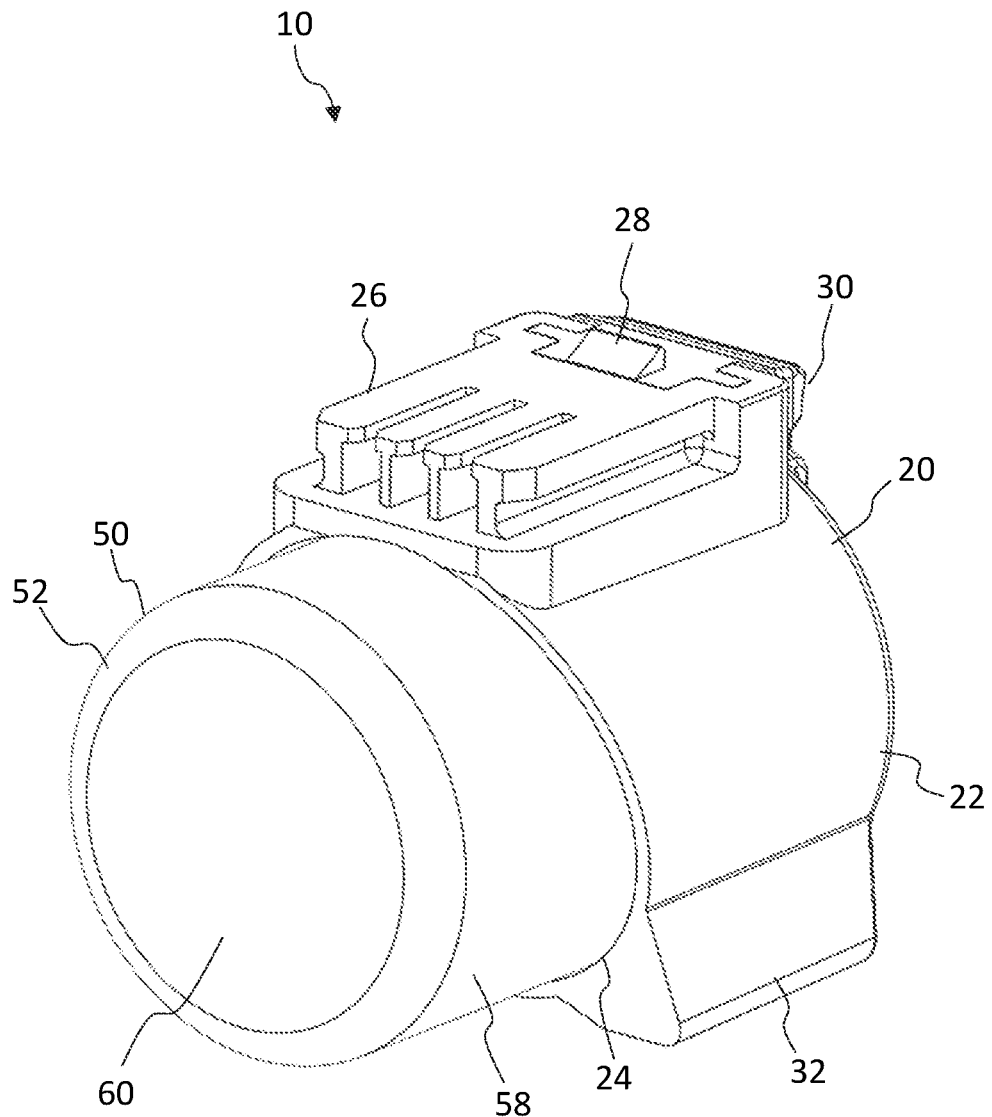
FIG. 3 shows a front perspective view of the battery pack of FIG. 1.
Figure 4:
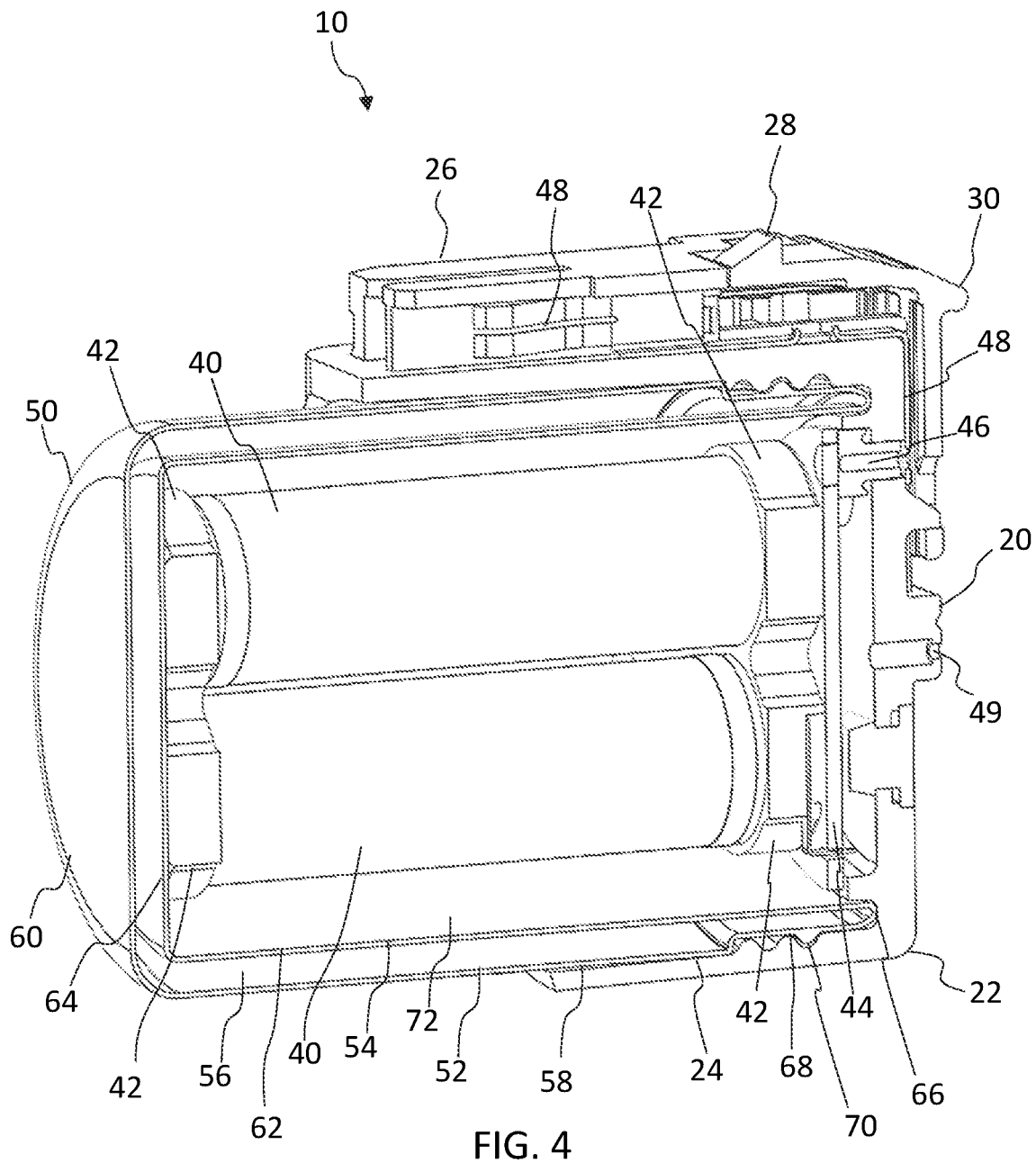
FIG. 4 shows a cross-sectional view of the battery pack according to one embodiment.

Turning now to FIGS. 2-4, the insulated battery system or battery pack 10 is shown in more detail. The battery pack 10 may include a lid or casing 20 for receiving a vacuum insulated bottle, container, or housing 50. The casing 20 may include a hollow cylindrical-shaped cap or body 22 with an internal opening 24. The battery pack 10 may include a plastic cap or tool interface 26 configured to secure the battery pack 10 to the powered instrument 12. For example, the tool interface 26 may include a plurality of fingers or rails configured to slidably mate with a corresponding interface on the bottom of the handle 14. The tool interface 26 includes one or more electrical connections configured to electrically couple to internal components of the tool 12, thereby providing power to the tool 12. The interface 26 may include a latch 28 to releasably secure the battery pack 10 to the instrument 12. The latch 28 may be released with a button 30 depressable by a user to thereby remove the battery pack 10 from the instrument 12. The underside of the casing 20 may include one or more feet 32 configured to stabilize the battery pack 10 and instrument 12 when attached thereto.

The lid or casing 20 and/or other components of the battery pack 10 may be formed of one or more metals, plastics, or other suitable materials. In one embodiment, the lid or casing 20 is formed of a solid plastic, such as injection molded plastics or vacuum formed plastics. The plastics may include polypropylene (PP), polyethylene (PE), PEEK PSU, poly(phenylene oxide) (PPO), polyester, polycarbonate (PC), acrylonitrile butadiene styrene (ABS), acrylic, nylon, or combinations thereof.

With further emphasis on FIG. 4, the insulated battery pack 10 is configured to house one or more battery cells 40. The battery cells 40 may include disposable batteries or rechargeable batteries that are charged before use. In an exemplary embodiment, the battery cells 40 are rechargeable batteries that are preferably charged prior to an autoclave or sterilization process. The batteries 40 may include nickel-cadmium (NiCd), nickel-zinc (NiZn), nickel metal hydride (NiMH), lithium-ion (Li-ion), or any suitable rechargeable cells. Although cylindrical batteries 40 are shown, it will be appreciated that the batteries may include any suitable batteries presently available or later developed. The insulated battery pack 10 may house one, two, three, four or more adjacent battery cells. It will be appreciated that any suitable number, type, and configuration of battery cells 40 may be selected based on the application. The battery cells 40 are each receivable in a battery holder 42. Each battery holder 42 is configured for holding the battery 40 such that the holder 42 makes appropriate electrical contact with the battery terminals (e.g., positive terminal is cathode and negative terminal is anode).

The battery holder 42 electrically connects to the printed circuit module or printed circuit board (PCB) 44. The printed circuit board 44 protects the battery pack 10 from overcharging, over-discharging, and over-draining. The PCB 44 prevents damage, fire, or explosion of the battery pack 10. In one embodiment, the PCB 44 is replaced with or part of a battery management system (BMS). The BMS is an electronic system that manages the rechargeable battery by monitoring its state, calculating data, protecting the battery, controlling its environment, and/or balancing it. In particular, the BMS may be included for a lithium-ion battery system to manage real-time control of each battery cell 40, measure temperature and voltage, communicate with external devices, and/or manage calculations. The BMS may include a microcontroller with intelligent integrated software that calculates and interprets different types of measurements such as the state of charge (SOC) or state of health (SOH). A sealed electrical pass-through 46 may connect the PCB 44 to the spring terminal 48, which provides power to the tool 12 when coupled to the battery pack 10.

The casing 20 may include a check valve 49 embedded therein to allow for any gasses to escape in a catastrophic battery failure. The check valve 49 prevents the possibility of the battery pack 10 from becoming a pressure vessel creating further hazard. Additionally, the check valve 49, when suitably rated, allows for the air internal to the container 50 to escape during the vacuum stage of the autoclave cycle. The check valve 49 also prevents any reentry of steam or air, thereby further amplifying the effects of insulation from the heat of the autoclave by eliminating conduction and convection within the cell space.

Figure 5:
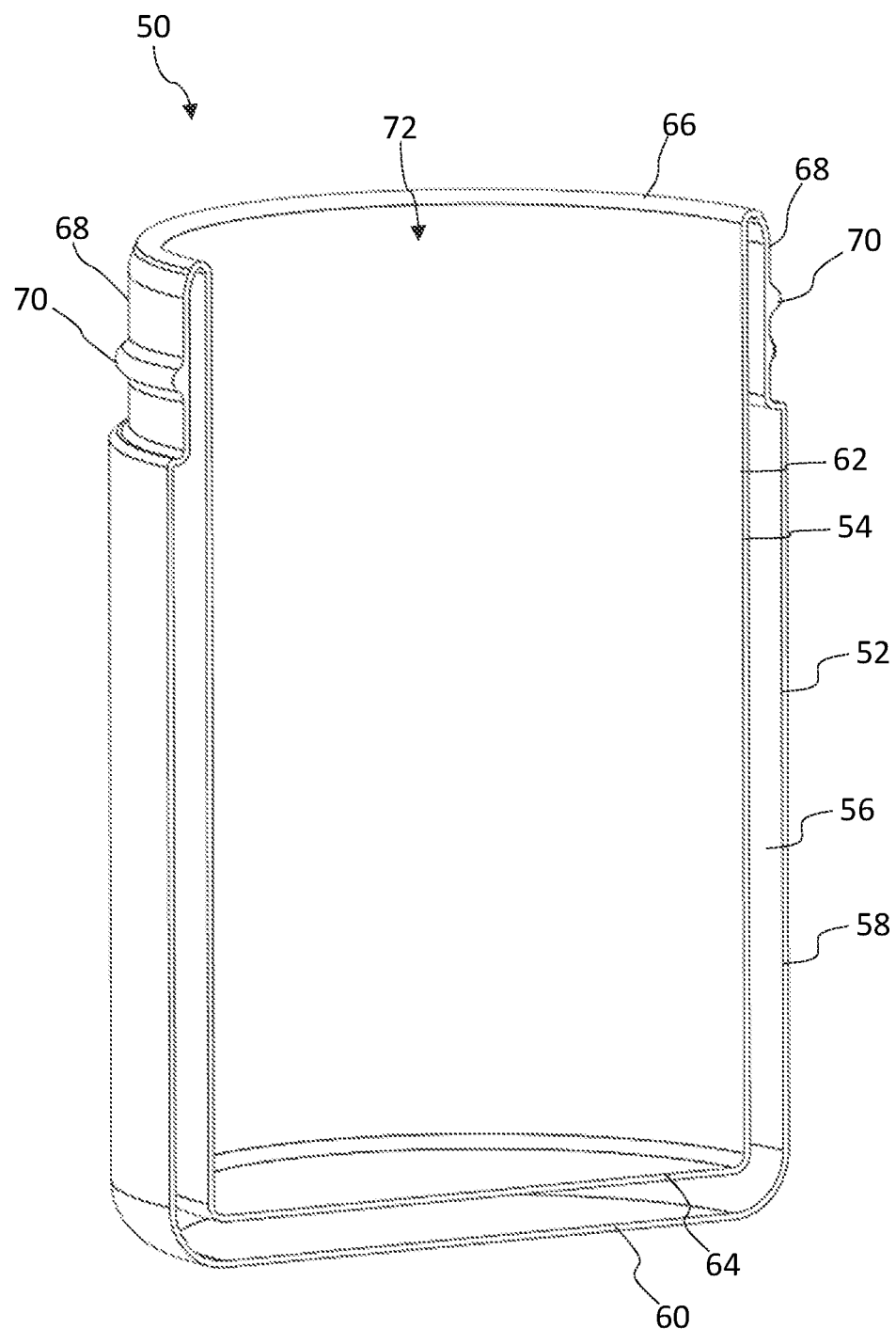
FIG. 5 shows a cross-sectional view of a vacuum insulated housing according to one embodiment.
Figure 6:
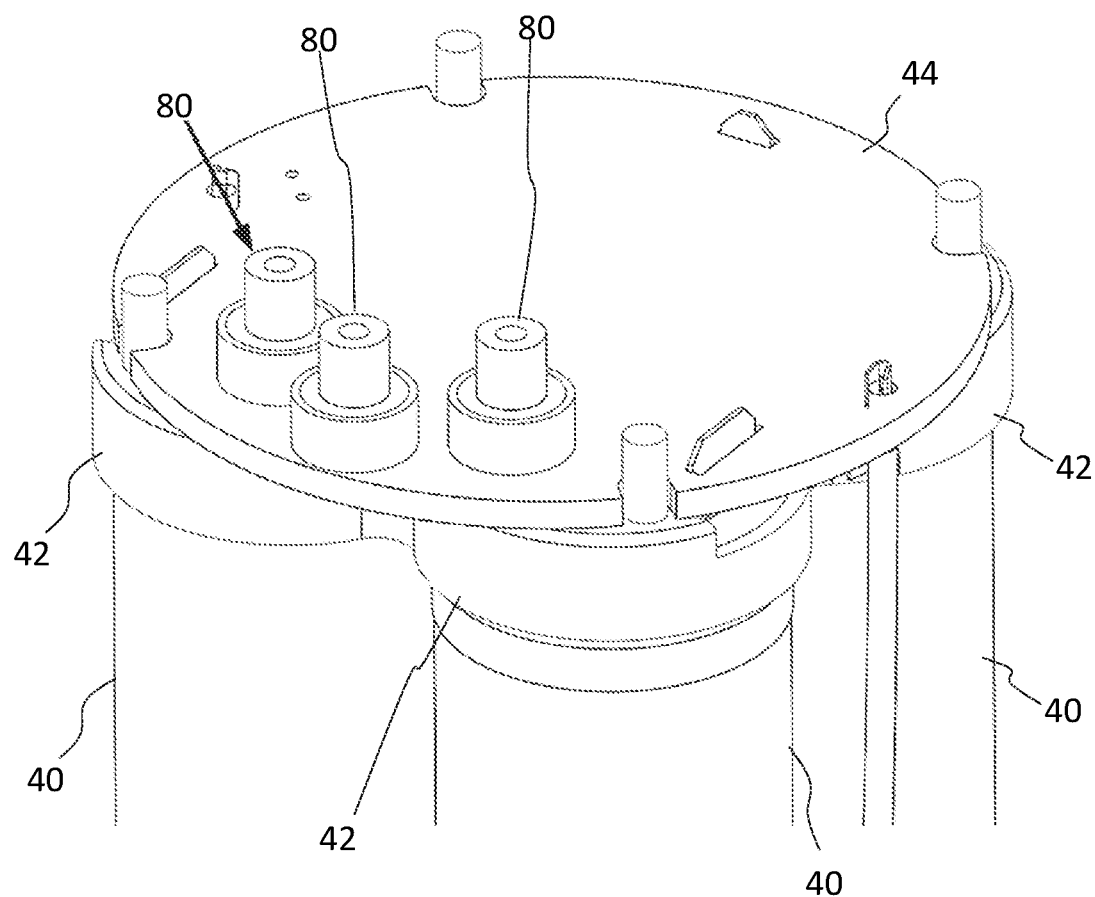
FIG. 6 is a close-up perspective view of electrical pass-throughs directly soldered to the printed circuit board of the battery pack according to one embodiment.

Turning now to FIG. 5, the vacuum insulated bottle, container, or housing 50 is shown according to one embodiment. The vacuum insulated housing 50 may include a double walled container or bottle. The double walled container 50 includes an outer wall 52 and an inner wall 54 with a vacuum space 56 in between the walls 52, 54. The double walled container 50 forms a gas-tight enclosure around the vacuum space 56, from which air has been completely or almost completely evacuated. The outer wall 52 includes an outer side wall 58 and an outer bottom wall 60. The inner wall 54 includes an inner side wall 62 and an inner bottom wall 64. The outer and inner side walls 58, 62 meet at a top lip 66 to fully enclose the vacuum space 56. The outer and inner side walls 58, 62 may form a generally cylindrical body although it will be appreciated that other suitable shapes may be selected. The outer and inner bottom walls 60, 64 may form a generally flat bottom but it will be appreciated that the bottom walls 60, 64 could be otherwise configured. Although a double walled container 50 is exemplified, it will be appreciated that the housing 50 could have additional layers of insulation including additional walls with additional vacuum layers in between. In some embodiments, the outer surface of the inner wall may be mirrored or coated in a reflective layer to further improve insulation by reflecting away radiation heat transfer.

The vacuum insulated housing 50 may have a narrowed neck 68 near the top lip 64. For example, the outer side wall 58 may be narrowed inwardly toward the inner side wall 58 to form the neck 68. The neck 68 may be configured to receive a cap or lid 20, 100 to thereby seal the container 50. As best seen in the embodiment shown in FIG. 4, the cap or lid may be an integral component of the casing 20. The neck 68 may include one or more mating members 70 configured to engage with corresponding features in the cap, lid, or casing 20. The mating members 70 may include one or more protrusions, rings, threads, ridges, beads, or other features configured to seal the cap or lid to the neck 68 of the housing 50. In a preferred embodiment, the mating features are threads. In one embodiment, the mating member 70 includes a ridge extending circumferentially around the neck 68 and a plurality of corresponding recesses are formed inside the casing 20 to mate with the ridge, thereby securing the casing 20 to the housing 50. The casing 20 is configured to seal the housing 50 such that little or no moisture, temperature, or pressure is able to enter the chamber 72, for example, during autoclave sterilization.

The distance between the outer and inner walls 52, 54 may be constant or may vary. In an exemplary embodiment, the outer and inner walls 52, 54 have a constant width between the bottom walls 60, 64 and between the side walls 58, 62 until the region of the neck 68, which is narrowed. The walls 52, 54 may include 24 gauge (0.635 mm), 25 gauge (0.556 mm), 26 gauge (0.475 mm) or thinner stainless steel walls, for example. The vacuum gap 56 may range from about 1-5 mm, about 2-4 mm, or about 2-3 mm. In one embodiment, the double walled container 50 may include two 0.5 mm or thinner steel walls 52, 54 with a 3-4 mm vacuum gap 56 in between. The size of the double walled container 50 may be similar to plastic housings on batteries, which are generally 2-3 mm thick with 2-3 mm of insulation (if insulation is used). Therefore, the double walled container 50 may also have a total wall thickness of about 4-6 mm, about 4-5 mm, or about 5-6 mm.

The inner wall 54 of the housing 50 defines a central hollow chamber 72. The central hollow chamber 72 may include a generally cylindrical recess defined by the inner wall 54 of the bottle 50. The chamber 72 may have the same diameter from the mouth to the base of the bottle 50 or it may vary. In an exemplary embodiment, the chamber diameter is constant. As best depicted in FIG. 4, the hollow chamber 72 is configured to receive the battery cells 40 and the battery holders 42. The hollow chamber 72 may also house the printed circuit board 44 or battery management system components. It will be appreciated that the shape and size of the chamber 72 may be modified based on the configuration of the contents.

The double walled container 50 may be formed of one or more metals, plastics, or phase change materials as discussed in greater detail below. In one exemplary embodiment, the double walled container 50 may be formed from a metal, such as steel or stainless steel. The double walled container 50 provides for extremely good insulation. The space 56 between the walls 52, 54 is pulled to a high vacuum. A high vacuum may have a pressure in the range from 100 mPa to 100 nPa. The vacuum eliminates both conduction and convection as paths for heat transfer, leaving only radiation as a means of heat transfer through the vast majority of the bottle 50. There is still a conductive path through the lip 64 of the bottle 50 where the two walls 58, 62 meet. However, this path is a greatly reduced area for transfer compared to a fabric or other insulation means. Radiation heat transfer can further be reduced by raising the albedo of the inner wall 54 by making it reflective. For example, the albedo may be greater than 0.5, greater than 0.6, greater than 0.7, or greater than 0.8. These processes combined makes for a much lower heat transfer rate than other systems.

The vacuum insulated housing 50 can be used to resist heat from steam-based sterilization or autoclave processes. This is especially suitable in the case of components that are highly affected by heat, such as lithium-ion battery cells. Building a battery 10 where the majority of the housing is composed of the vacuum insulated bottle 50 reduces the heat felt by cells 40 more so then when compared to aerogel blankets or traditional plastic housing alone.

The battery cells 40 are placed inside the container 50 and need one or more ways of allowing current to exit the container 50. In one embodiment, the current may be able to exit via one or more electrical pass-throughs 46, for example, in the lid or casing 20. This may be done in the same way as typical battery packs if the lid or casing 20 is made of simple plastic geometry. While this does limit the effectiveness of the vacuum bottle 50 as one end is no long a vacuum insulated wall, it is a comparably small section of the surface area of the pack. To overcome this, the lid or casing 20 may be insulated, for example, with aerogel blankets. In this case, the geometry of those blankets would be much simpler allowing for more complete coverage, and the surface area for which heat can pass through the less insulated portion is much smaller compared to existing designs.

With further emphasis on FIGS. 6-12, electrical pass-throughs 46 may include conductive components in the plastic lid or casing 20. In one embodiment, the electrical pass-through 46 may include one or more insert molded conductive pieces in the plastic lid 20 that are wired to the battery core pack. In another embodiment, the electrical pass-through 46 may include one or more conductors 80 with o-rings 82 that pass through the plastic lid 20. Either design may be blind to the inside to maintain a seal around the internal core pack to not allow hot steam to enter the inner chamber 72. The terminals on the outside of the pack 10 may be screwed to or soldered to the pass-throughs 46.

Figure 7:
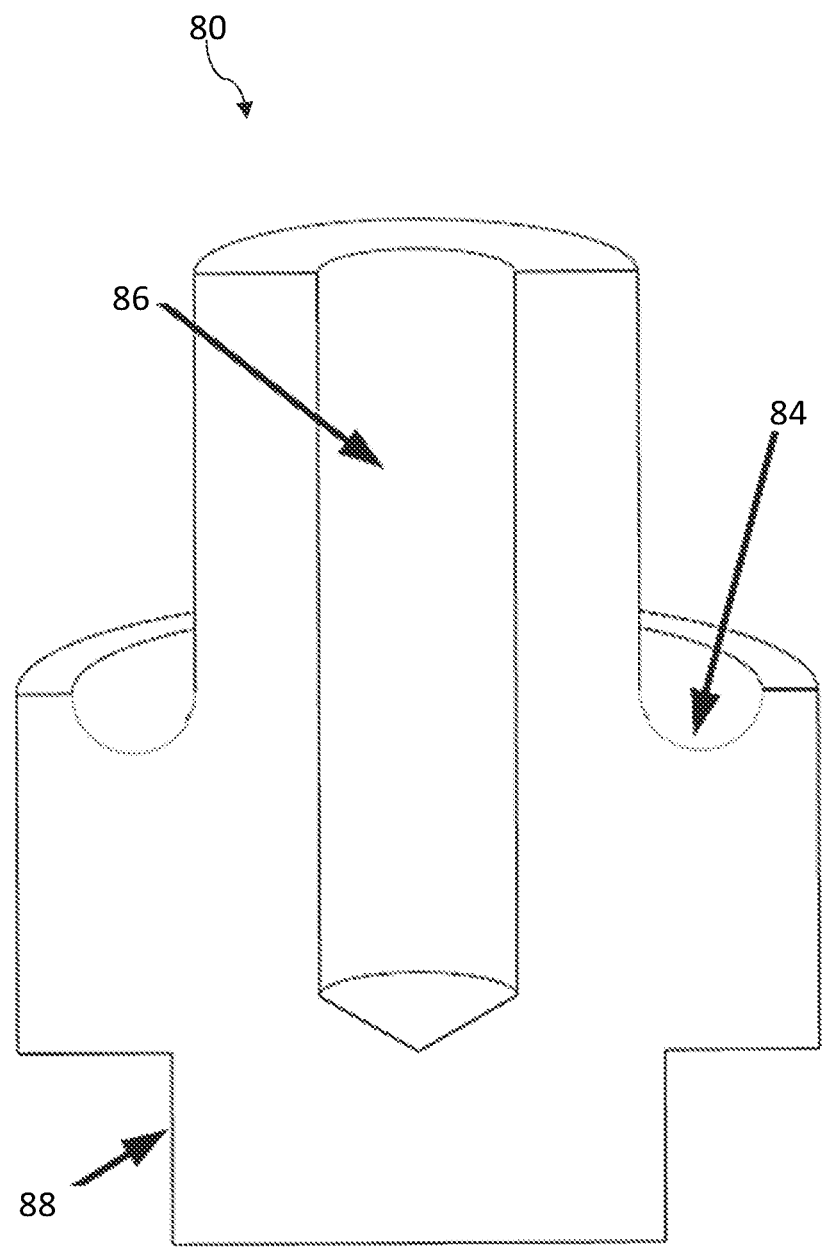
FIG. 7 shows a cross-sectional view of an electrical pass-through according to one embodiment.
Figure 8:
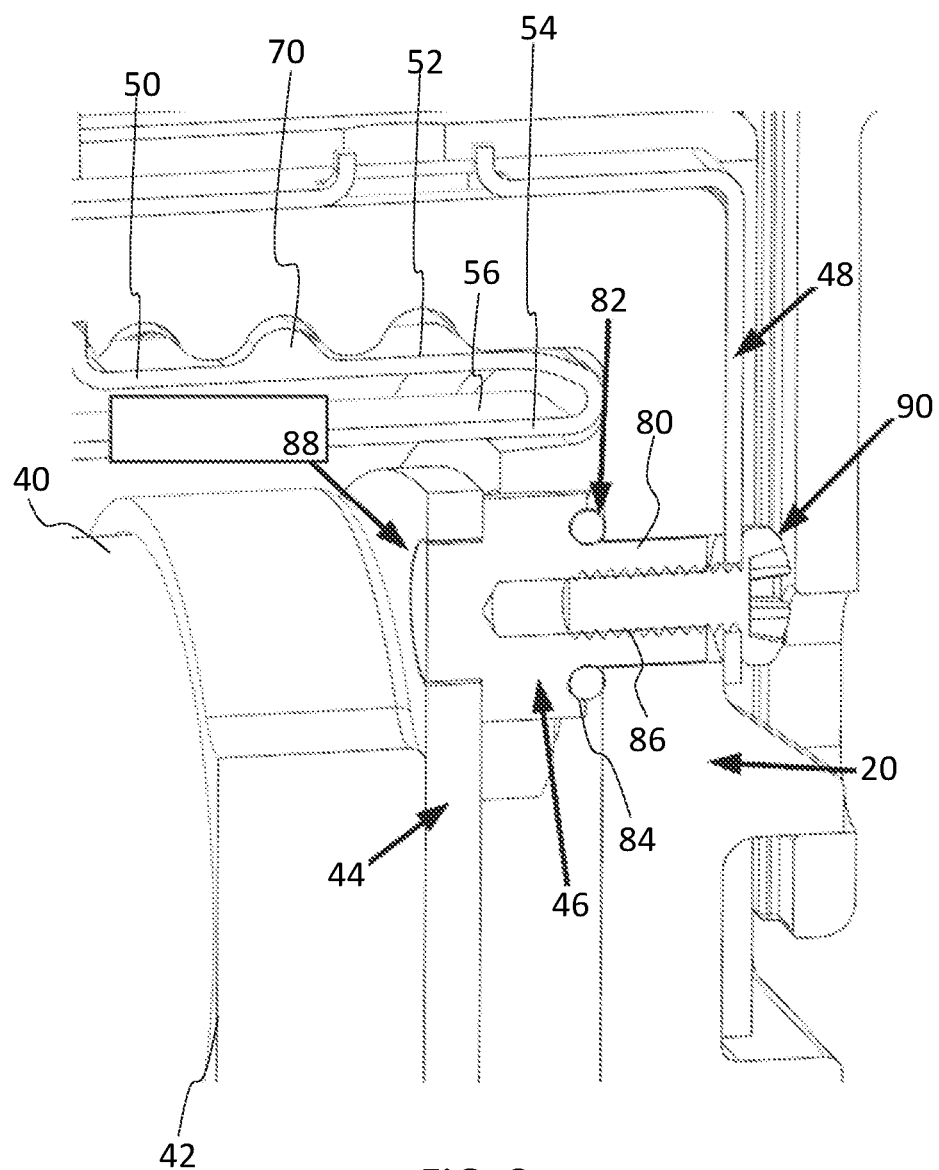
FIG. 8 is a close-up cross-sectional view of the electrical pass-through assembly of the vacuum insulated system according to one embodiment.
Figure 9:
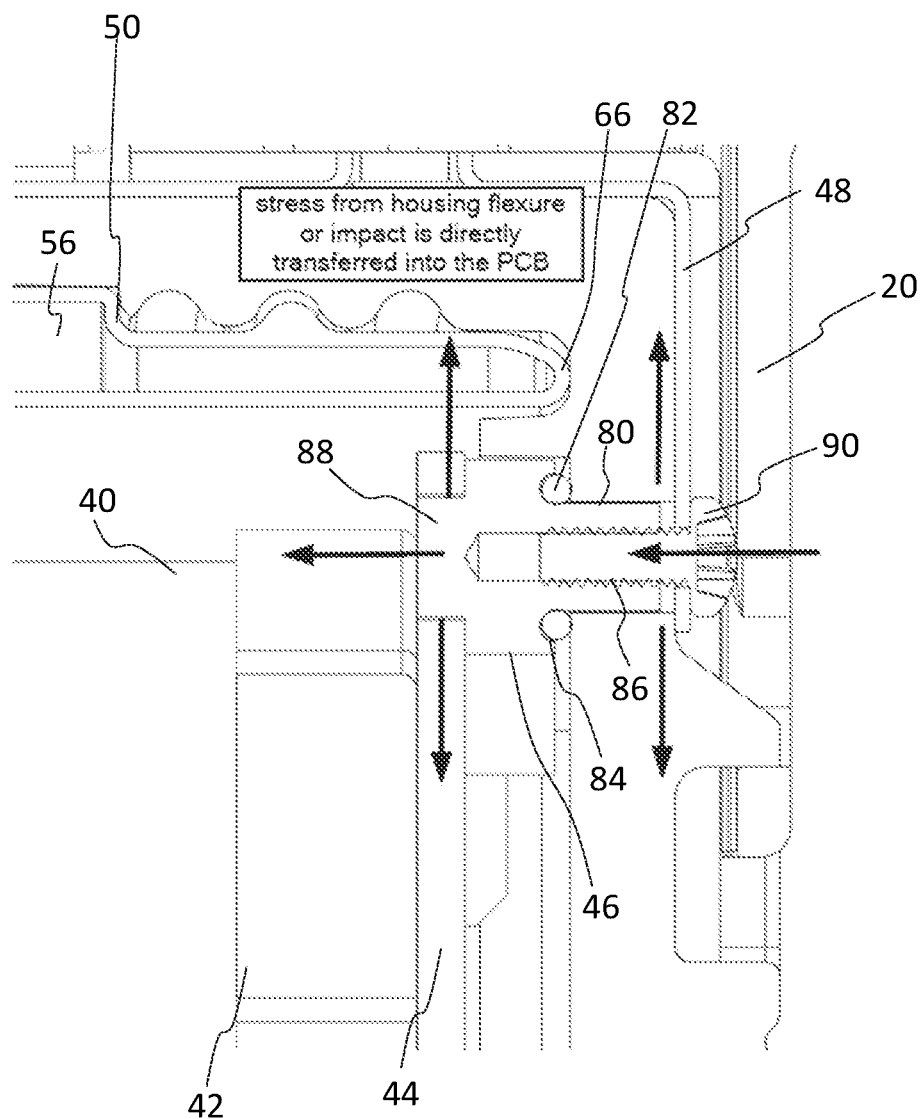
FIG. 9 shows a cross-sectional view depicting stress that may be imparted directly to the printed circuit board from the electrical pass-through according to one embodiment.

As shown in FIGS. 6-9, the electrical pass-through 46 may include one or more conductors 80 connect to the battery management system (BMS) and/or printed circuit board (PCB) 44. The PCB 44 may be directly soldered or screwed to the inside surface of the pass-throughs 46. As best seen in FIG. 7, the conductor 80 may include a body with a blind hole 86 through a top surface, a base or seat 88 for contacting the PCB 44, and a central ring with an o-ring seat 84. As shown in the assembly in FIG. 8, the seat 88 may be positioned in an opening and soldered to the PCB 44. A threaded portion of the screw 90 may be positioned into the blind hole 86 with a head of the screw 90 pressing against and securing the spring terminal 48. The o-ring 82 may be positioned in the o-ring seat 84 between the conductor 80 and the casing 20. The screws 90 may be useful with the o-ring seals to maintain pressure on the o-ring 82, thereby sealing the perimeter of the pass-through 46. It will be appreciated that other means of securing the conductor 80 may be used. The soldered and/or screwed connection guarantees alignment between the PCB 44 and any features on the lid 20, such as LED windows for a state of charge. As shown with the depiction of arrows in FIG. 9, this configuration may cause stress from housing flexure and/or impact to directly transfer into the PCB 44.

Figure 10:
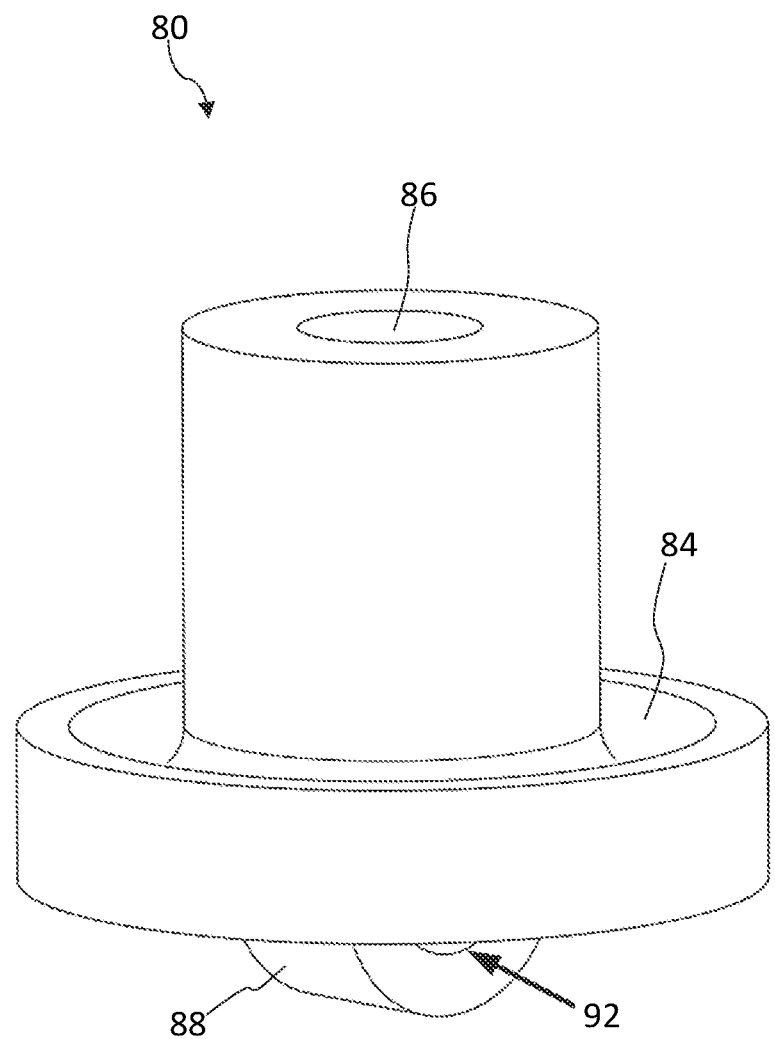
FIG. 10 shows a perspective view of an electrical pass-through according to one embodiment.
Figure 11:
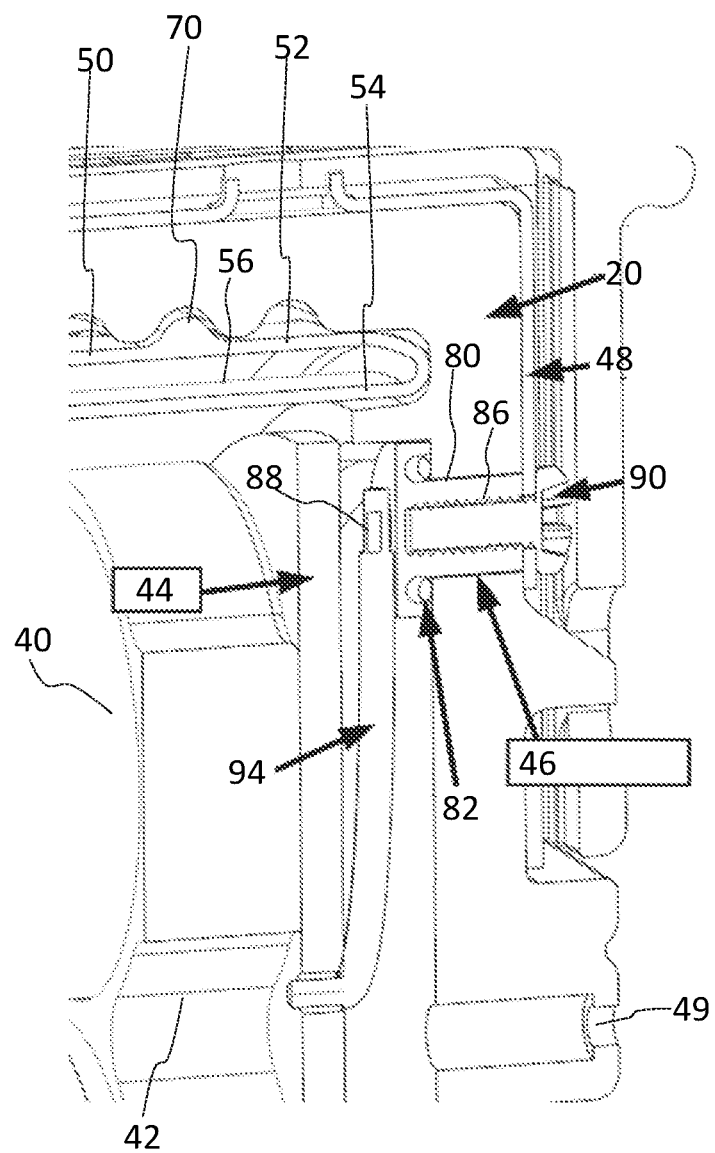
FIG. 11 shows a close-up cross-sectional view of the electrical pass-through assembly with a wire running from the printed circuit board to the pass-through according to one embodiment.
Figure 12:
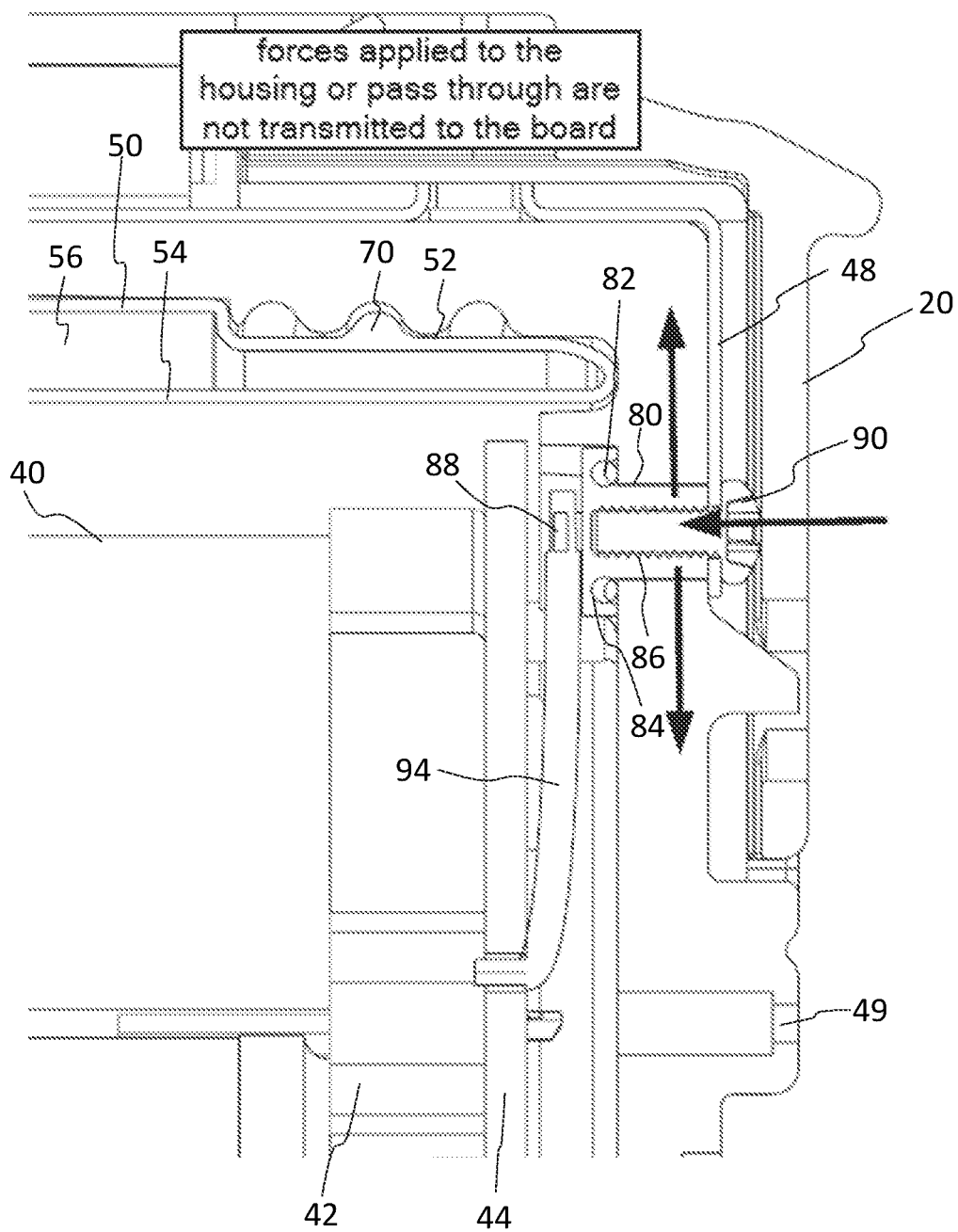
FIG. 12 shows a cross-sectional view depicting forces applied to the housing or pass-through that are not directly transmitted to the printed circuit board according to one embodiment.

In FIGS. 10-12, another embodiment of a conductor 80 for the electrical pass-through 46 is shown. To avoid stresses being transferred directly to the board 44 via the pass-throughs 46, the pass-through 46 may be connected with wires 94 run from the BMS and/or PCB 44 to the pass-throughs 46. As shown in FIG. 10, the conductor 80 may include a rounded bottom seat 88 with a wire trap 92 to retain the wire 94. As shown in the assembly in FIG. 11, the seat 88 receives one end of the wire 94 and the opposite end of the wire 94 is soldered to the PCB 44. The screw 90 may still be positioned into the blind hole 86 with the head of the screw 90 pressing against the spring terminal 48 to secure the conductor 80. The o-ring 82 is positioned in the o-ring seat 84 between the conductor 80 and the housing 20. The screw 90 maintains pressure on the o-ring 82 to seal the pass-through 46. In this case, as shown with the depiction of arrows in FIG. 12, the forces applied to the housing 20 or pass-through 46 are not transmitted to the board 44. The wires 94 allow for disconnecting of the PCB 44 from any housing stresses at the pass-throughs 46, but it may need other means of rotationally aligning the PCB 44 to any features on the lid 20, such as LED windows for a state of charge.

Figure 13:
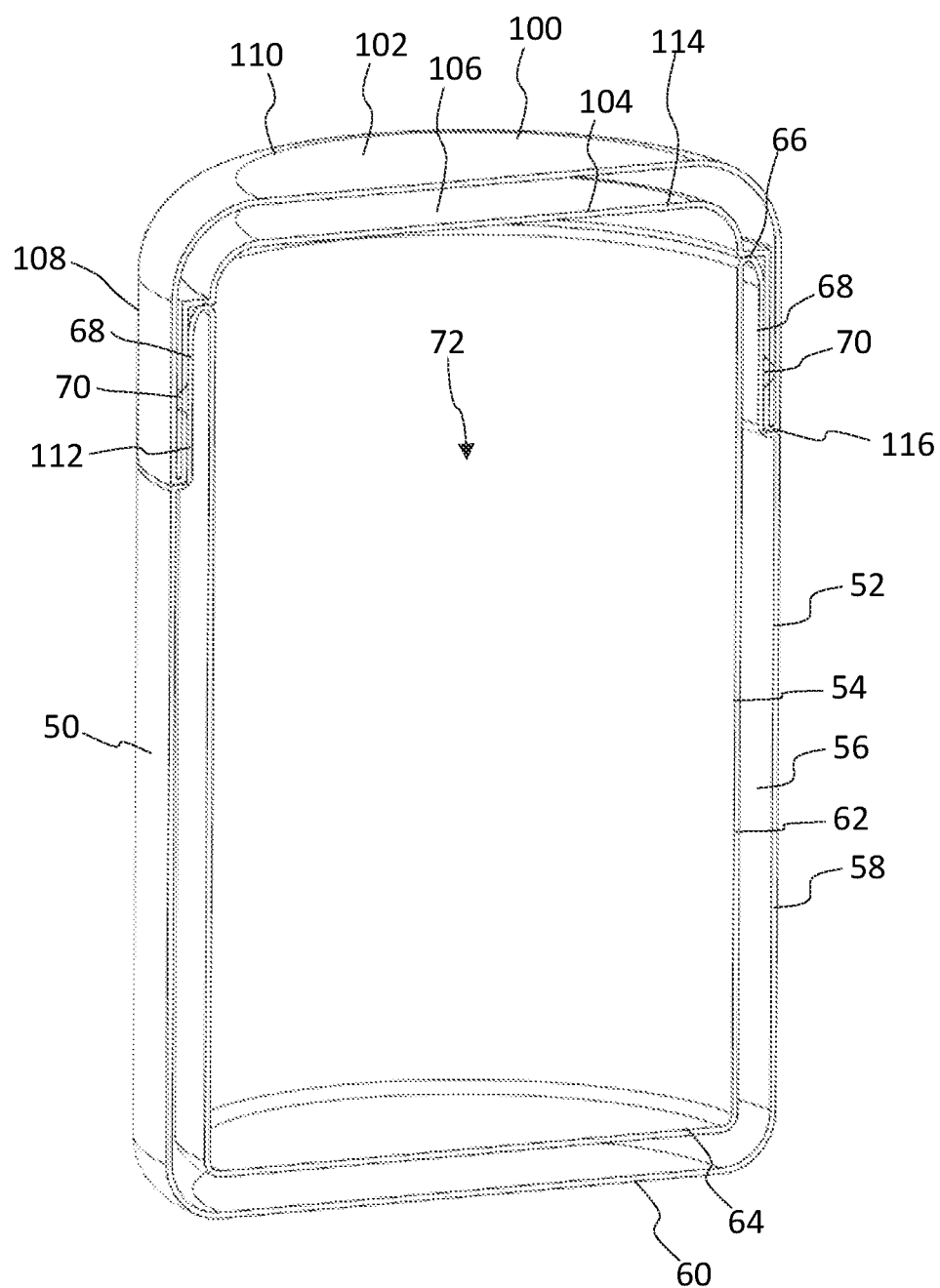
FIG. 13 shows a cross-sectional view of the vacuum insulated housing with a vacuum insulated top or lid according to one embodiment.
Figure 14:
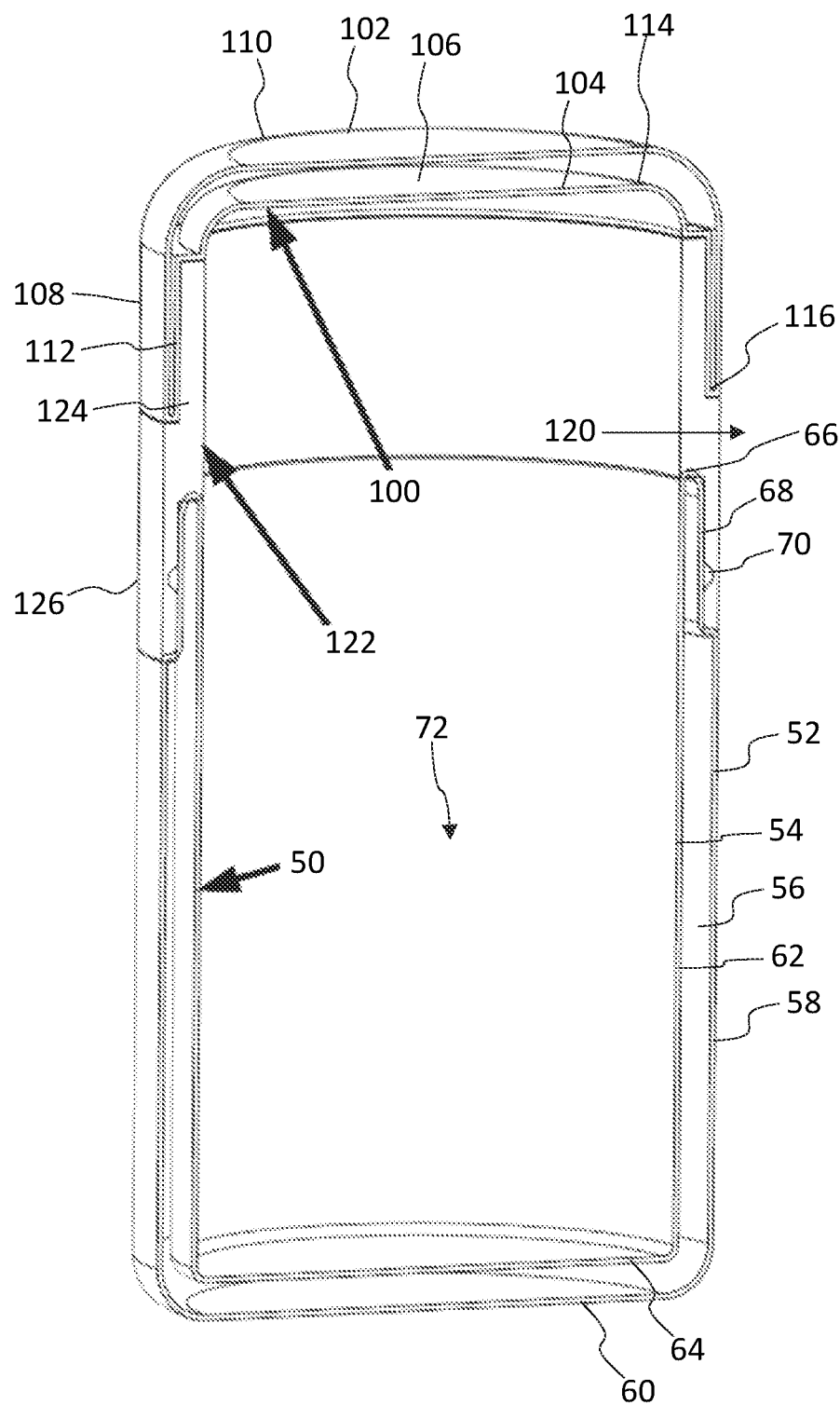
FIG. 14 shows a cross-sectional view of the vacuum insulated housing with a separator positioned between the top and the housing according to one embodiment.

Turning now to FIGS. 13 and 14, embodiments of the sealed vacuum insulated container 50 are shown with a lid, cap, or top 100. The top 100 may replace lid or casing 20 or may be a component of it. In this embodiment, the top 100 is made as a vacuum insulated top or lid. The top 100 may include a continuous bubble of vacuum similar to container 50. The vacuum insulated top 100 may include a double walled lid having an outer wall 102 and an inner wall 104 with a vacuum space 106 in between the walls 102, 104. The outer wall 102 includes an outer side wall 108 and an outer top wall 110. The inner wall 104 includes an inner side wall 112 and an inner top wall 114. The outer and inner side walls 108, 112 meet at a lower lip 116. The outer and inner walls 102, 104 or a portion thereof fully enclose the vacuum space 106. The outer and inner top walls 110, 114 may form a generally flat top but it will be appreciated that the top walls 110, 114 could be otherwise configured for the overall battery design.

As shown in FIG. 13, the insulated lid 100 may be configured to mate with the neck 68 of the container 50. For example, the inner side wall 112 may be recessed such that the inner side wall 112 mates against the outer side wall 52 of the container 50 at the neck 68. The neck 68 and/or mating member 70 of the container 50 may be configured to engage with or fit against the inner side wall 112 of the lid 100 to thereby releasably secure the lid 100 to the container 50. For example, the mating member 70 may engage with one or more recesses, threads, or other friction enhancing elements on the lid 100 to thereby seal the lid 100 to the container 50.

Due to the vacuum pressure needed, it may be desirable for the top 100 or a portion thereof to be made of metal. The metal may include steel, such as stainless steel, titanium, nickel, or other suitable metals or combinations thereof. In some cases, the metal vacuum lid 100 may complicate the design of the electrical pass-throughs. In one embodiment, shown in FIG. 14, the electrical pass-through 120 may be achieved with an interstitial plastic ring 122 between the two halves 50, 100. In another embodiment, the pass-through may use the bottle 50 itself as the means of conduction of current to the exterior of the pack with a thinner electrically insulative ring to separate the top and bottom 50, 100. In some instances, a metal lid 100 may be difficult to incorporate with a state of charge led activation. Because of these complications, it may be desirable in some cases to use a plastic top, lid, or casing 20, 100, for example, with traditional insulation to complete the vacuum insulated pack 10.

With further emphasis on FIG. 14, the insulated lid 100 may be separated from the container 50 with separator 122. The separator 122 may include a plastic separator to allow a possible electrical pass-through 120 to outside of the chamber 72. The separator 122 may include a ring with a stepped profile to mate with the container 50 and the lid 100. The separator ring 122 may include an upper band 124 with a recessed outer surface configured to mate with the inner side wall 112 of the lid 100 and a lower band 126 with a recessed inner surface configured to mate with the neck 68 of the outer side wall 58 of the container 50. The separator ring 122 may be otherwise configured to separate the lid 100 from the container 50 to provide the desired electrical pass-through 120 while still maintaining an adequate seal for the pack 10.

Using a metal for the housing of the vacuum insulated bottle 50 may allow for a unique feature for state of charge (SOC) led activation. The surface of the bottle 50 being conductive can act as a capacitive touch sensor allowing user control of the SOC indicator without the need for a separate pass through or a sealed mechanical button pass through. This would allow a user to manually activate the state of charge indicator by touching the bottle 50 of the battery pack. This feature may be similar to commercial battery packs that typically have a button to check state of charge on demand bringing more familiar features from the power tool realm into the surgical space.

According to another embodiment, the thermal resistance of the system may be further expanded by use of one or more phase change materials (PCM). Phase change materials absorb or release a large amount of latent heat during the process of transforming physical properties. Suitable phase change materials may include paraffin wax, polyethylene oxide (PEO), or other proprietary formulations, for example, for lithium batteries. The phase change materials could be incorporated into the bottle 50, the casing 20, the lid 100, or a portion or component of the battery pack 10 to insulate the battery cells 40 and other battery components.

Paraffin wax is a PCM that has one of the highest latent heats only surpassed by molten salts, metals, and water. Paraffin wax has an ideal melting temp for lithium-ion batteries in the range of 40-50° C. When paraffin max melts, it may expand at a minimum of 10% often closer to 20% in volume and becomes a very low viscosity fluid. This may require the pack to be sealed to a water tight level, which is done for sterile packs due to the steam in an autoclave, but the wax also needs to expand and contract in the container. This could be achieved with a diaphragm to allow the wax to expand and contract or the space for expansion is built into the pack, for example, by only partially filling the PCM space in the pack. A partially filled space may lead to circumstances where full cells are left with no PCM in contact leading to much less accurate temperature readings from an onboard thermistor, increased imbalancing rates, and/or a hazardous situation where the thermistor is reading the coldest cell and other cells not in contact with the PCM are significantly hotter.

A second option is crystalline to amorphous PCMs, such as polyethylene oxide (PEO). PEO has only around half the latent heat as paraffin wax, however, PEO expands a negligible amount upon changing phase. In the amorphous state, PEO is still an extremely viscous fluid that will largely stay in place eliminating the sealing and the expansion issues that come from wax. PEO may be poured into the housing of the battery as a fine powder covering the entirety of the cells or it may be pressed into blocks which can then be fixed in place with the cell holder.

As described in the embodiments provided herein, thermal protection from autoclave heat provides for potential advantages not possible in current sterile batteries. As previously described, cycle life is greatly affected by heat of battery cells. Typical LiFePO$_4$ cells should last around 2000 cycles, but anecdotal evidence shows cycle life being much less for typical sterile batteries, as low as 100 cycles. Greater thermal protection with the same cell selection should greatly increase battery cycle closer to the expected level of approximately 2000 cycles, thereby resulting in a 20× increase in lifespan of the product with a similar package size.

It will also be appreciated if the interior space of the battery never reaches high temperature levels during sterilization (e.g., about 70° C. or less), then other battery chemistries may be used. The LiFePO$_4$ chemistry is typically used to prevent thermal degradation of the packs because that chemistry handles high temperatures better than most that have useful power but it can still greatly shorten battery life. Chemistries typically used in power tool applications, such as NMC and NCA, have a higher voltage per cell (10-15% more) and a much higher capacity (100-300% more). This allows for the same voltage and a higher capacity using fewer cells than typical iron phosphate packs which should translate to higher energy and power densities.

Higher voltage means lower currents in the tool and pack for the same power level. This should prolong the cycle life of the pack as well as the tool. Joule heating from electrical power is related directly to the current squared meaning less heat generated in the cell and less heat generated in the motor coils.

Vacuum insulated bottle designs reduce heating of internal pack components, specifically the cells but also the BMS components, thereby reducing the thermal degradation of the pack and allowing for longer useful lifespans of the pack. This improved thermal performance also allows for alternate chemistries to be used that can greatly increase the energy and power density over traditional designs. These factors combined yield a much superior pack with longer lifespan, longer runtime, and/or higher power, in a similar package size and unit cost.

Although the invention has been described in detail and with reference to specific embodiments, it will be apparent to one skilled in the art that various changes and modifications can be made without departing from the spirit and scope of the invention. Thus, it is intended that the invention covers the modifications and variations of this invention provided they come within the scope of the appended claims and their equivalents. It is expressly intended, for example, that all components of the various devices disclosed above may be combined or modified in any suitable configuration.

What is claimed is:

1. An insulated battery system comprising:
    a vacuum insulated housing having a lower section and an upper section, and including an outer wall and an inner wall defining an annular vacuum space having a pressure of between 100 mPa and 100 nPa in between the outer and inner walls, the inner wall defining a central hollow chamber, wherein the lower section has a first outer diameter and the upper section has a second outer diameter lower than the first diameter, wherein the upper section includes an exterior circumferential ridge defining an exterior threading, wherein the circumferential ridge extends from the upper section such that a portion having the second outer diameter is located both above and below the circumferential ridge;
    a battery cell receivable in a battery holder;
    a printed circuit board electrically connected to the battery holder, wherein the battery cell, the battery holder, and the printed circuit board are housed inside the central hollow chamber of the vacuum insulated housing; and
    a casing for sealing the vacuum insulated housing, and including an inner sidewall configured to threadably engage the external threading to releasably secure the casing to the housing.

2. The insulated battery system of claim 1, wherein the outer wall of the vacuum insulated housing includes an outer side wall and an outer bottom wall, and the inner wall includes an inner side wall and an inner bottom wall, wherein the outer and inner side walls meet at a top lip to fully enclose the vacuum space.

3. The insulated battery system of claim 1, wherein the vacuum insulated housing has a generally cylindrical body.

4. The insulated battery system of claim 1, wherein the vacuum insulated housing includes a narrowed neck, and the casing engages with the narrowed neck to thereby seal the battery system.

5. The insulated battery system of claim 1, wherein the vacuum insulated housing includes two 0.5 mm walls with a 3-4 mm vacuum gap in between.

6. The insulated battery system of claim 1, wherein one or more electrical passthroughs allow current to exit from the vacuum insulated housing.

7. The insulated battery system of claim 6, wherein the electrical passthrough is a conductor in the casing.

8. The insulated battery system of claim 7, wherein the conductor includes a body with a blind hole through a top surface, a seat for contacting the printed circuit board, and a central ring with an o-ring seat for receiving an o-ring positioned between the conductor and the casing, and wherein a screw is threaded into the blind hole with a head of the screw pressing against and securing a spring terminal and thereby sealing the pass-through.

9. The insulated battery system of claim 7, wherein the conductor is connected to the printed circuit board with a wire, the conductor includes a rounded bottom seat with a wire trap configured to retain the wire.

10. An insulated battery pack comprising:
    a vacuum insulated housing having a lower section and an upper section, and extending from a top lip to a bottom wall and defining a central hollow chamber, the vacuum insulated housing includes an outer wall and an inner wall defining an annular vacuum space having a pressure of between 100 mPa and 100 nPa in between, wherein the lower section has a first outer diameter and the upper section has a second outer diameter lower than the first diameter, wherein the upper section includes an exterior circumferential ridge defining an exterior threading, wherein the circumferential ridge extends from the upper section such that a portion having the second outer diameter is located both above and below the circumferential ridge;
    a casing for sealing the vacuum insulated housing, and including an inner sidewall configured to threadably engage the external threading to releasably secure the casing to the housing:
    a battery holder positioned in the central hollow chamber of the vacuum insulated housing;
    a rechargeable battery cell connected to the battery holder;
    a printed circuit board electrically connected to the battery holder and housed within the central hollow chamber; and
    an electrical pass-through in the casing connecting the printed circuit board to a spring terminal, wherein the casing comprises a tool interface comprising a plurality of rails configured to slidably mate with a corresponding interface of an instrument and a latch configured to releasably secure the battery pack to the instrument.

11. The insulated battery pack of claim 10, wherein the casing includes a check valve embedded therein to allow for any gasses to escape.

12. The insulated battery pack of claim 10, wherein the vacuum insulated housing has a generally cylindrical body.

13. The insulated battery pack of claim 10, wherein the vacuum insulated housing includes a narrowed neck, and the casing engages with a ridge on the narrowed neck to thereby seal the battery pack.

14. The insulated battery pack of claim 10, wherein the electrical pass-through is a conductor having a body with a blind hole through a top surface, a seat, and a central ring with an o-ring seat, and wherein a screw is threaded into the blind hole with a head of the screw pressing against and securing the spring terminal, and an o-ring is positioned in the o-ring seat between the conductor and the casing to seal the pass-through.

15. The insulated battery pack of claim 10, wherein the conductor is soldered directly to the printed circuit board or is connected to the printed circuit board with a wire.

16. The insulated battery system of claim 1, wherein an outer surface of the inner wall is mirrored or coated in a reflective layer.

17. The insulated battery system of claim 1, wherein the inner wall has an albedo of greater than 0.5.

18. The insulated battery system of claim 1, wherein one or more of the vacuum insulated housing, the casing, or a lid of the insulated battery system comprises a phase change material.

\* \* \* \* \*